Nov. 6, 1923.
N. ZIERTEN
RIVET
Filed Jan. 29, 1923
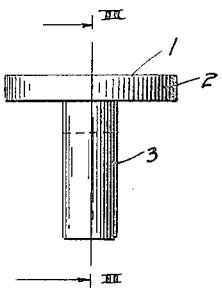
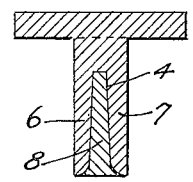
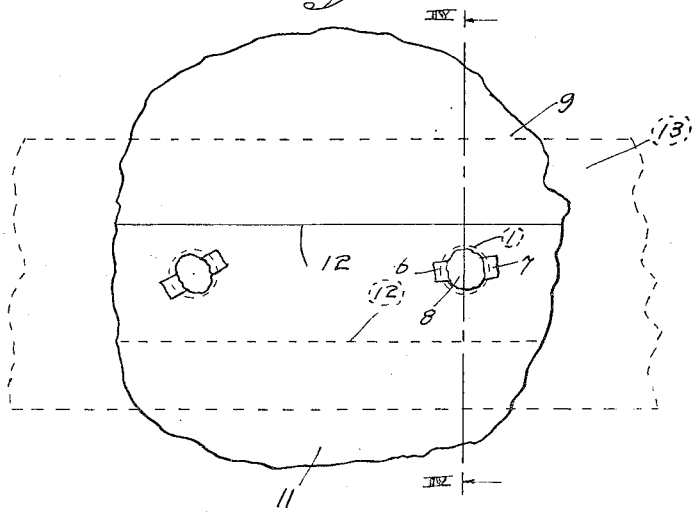
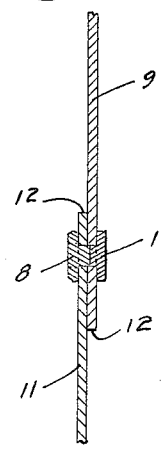
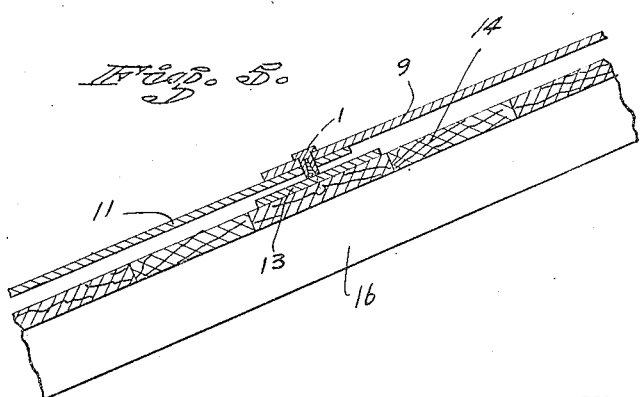
INVENTOR.
N. ZIERTEN
BY
ATTORNEYS.

Patented Nov. 6, 1923.

1,473,137

UNITED STATES PATENT OFFICE.

NICHOLAS ZIERTEN, OF ALBANY, CALIFORNIA.

RIVET.

Application filed January 29, 1923. Serial No. 615,667.

*To all whom it may concern:*

Be it known that I, NICHOLAS ZIERTEN, a citizen of the United States, and a resident of Albany, county of Alameda, State of California, have invented a new and useful Rivet, of which the following is a specification.

The present invention relates to improvements in rivets such as are commonly used for the joining together of two metal plates or the like. My rivet is particularly designed for use in connection with thin metal plates such as might be used for roofing and similar purposes, but it should be understood that I do not wish to be confined to this particular use. The principal object of the invention is to provide a rivet that has a split shank so as to form two legs adapted to part in opposite directions when driven against an element opposing endwise motion. A further feature of the invention is the introduction of a layer of material softer than that of the rivet, such as lead, into the split for the purpose of guiding the two legs in opposite directions during the driving action.

The preferred form of my invention is illustrated in the accompanying drawing in which Figure 1 shows a side view of my rivet, Figure 2 a vertical section through the same taken along line II—II of Figure 1, Figure 3 a plurality of rivets in their final position in two overlapping plates, the rivets appearing in end view, Figure 4 a cross section taken along line IV—IV of Figure 3, and Figure 5 an application of the use of my rivets in connection with the laying of a metal roof. While I have shown only the preferred form of the invention it should be understood that various changes or modifications may be made within the scope of the claims hereto attached without departing from the spirit of the invention.

My rivet (1) comprises a head (2) and a shank (3). The latter is split longitudinally as shown at (4) to form two legs (6) and (7) disposed in spaced relation to one another. The split is filled with a material (8) such as lead which is softer than the material the rivet is made of. The lead or other soft material preferably fills the whole split so that to a casual observer the appearance of the rivet seems not changed.

The use of the rivet is illustrated in Figures 3 and 4, two plates (9) and (11) overlapping one another as shown at (12) are joined by means of my rivets. The latter are introduced through holes previously prepared in the two plates which are placed on an element opposing end-wise motion of the rivets such as the metal plate (13), the location of which is indicated in Figure 3 in dotted lines. The head of each rivet is then struck with a hammer or similar tool whereby the end of the rivet is driven against the plate (13). Since the latter opposes endwise motion of the rivet, the end of the same has to spread in some manner under the influence of the blow of the hammer. The manner of spreading is controlled by the particular construction of the rivet. The soft material (8) will be merely squashed and will thereby force the two legs (6) and (7) apart into the position shown in Figure 3, that is, the soft material will force the two legs in opposite directions and will cause them to bend over and to lie tightly against the face of the lower plate, allowing the two plates to be forced upon one another with a degree of tightness that could not be obtained by the use of an ordinary rivet by merely striking the head of the same.

It will be readily seen that my rivet is particularly useful where only one side of the plates to be joined is readily accessible, as for instance, in laying a roof. In this case the sheeting (14) is supported on rafters (16) and the metal plates are placed on the sheeting. To rivet the metal plates together, if ordinary rivets are used, requires the presence of two men, one being on top of the roof and the other one underneath the same, the two cooperating by striking the rivet from opposite sides. Where my rivet is used one operator can handle the situation by merely introducing a metal plate (13) between the sheeting and the joint to be riveted and by driving the rivets against the metal plate.

I claim:

A rivet of the character described comprising a head and a split shank extending therefrom adaped to be parted when driven against an element opposing endwise motion, the split being filled with material softer than that of the rivet adapted to be spread during the driving action so as to guide the two parts formed by the split in opposite directions.

NICHOLAS ZIERTEN.